United States Patent
Hestetun

(10) Patent No.: US 11,542,790 B2
(45) Date of Patent: Jan. 3, 2023

(54) HYDROCARBON PRODUCTION FIELD LAYOUT

(71) Applicant: Vetco Gray Scandinavia AS, Sandvika (NO)

(72) Inventor: Steinar Lindemann Hestetun, Billingstad (NO)

(73) Assignee: VETCO GRAY SCANDINAVIA AS, Sandvika (NO)

(*) Notice: Subject to any disclaimer, the term of this patent is extended or adjusted under 35 U.S.C. 154(b) by 0 days.

(21) Appl. No.: 16/973,475

(22) PCT Filed: Jun. 13, 2019

(86) PCT No.: PCT/NO2019/050122
§ 371 (c)(1),
(2) Date: Dec. 9, 2020

(87) PCT Pub. No.: WO2019/240594
PCT Pub. Date: Dec. 19, 2019

(65) Prior Publication Data
US 2021/0238963 A1    Aug. 5, 2021

(30) Foreign Application Priority Data
Jun. 13, 2018   (NO) .................................. 20180820

(51) Int. Cl.
*E21B 43/017* (2006.01)
*F16L 55/46* (2006.01)
(Continued)

(52) U.S. Cl.
CPC .......... *E21B 43/0175* (2020.05); *F16L 55/46* (2013.01); *F16L 2101/12* (2013.01); *F16L 2101/30* (2013.01)

(58) Field of Classification Search
CPC ...... E21B 43/0175; E21B 23/08; E21B 37/00; F16L 55/46; F16L 2101/12; F16L 2101/30
See application file for complete search history.

(56) References Cited

U.S. PATENT DOCUMENTS

| 5,435,338 A | 7/1995 | Da Silva |
| 5,842,816 A | 12/1998 | Cunningham |
| 7,093,661 B2 * | 8/2006 | Olsen ..................... E21B 37/00 166/266 |

FOREIGN PATENT DOCUMENTS

| GB | 2 272 927 B | 9/1996 |
| WO | 01071158 W | 9/2001 |

(Continued)

*Primary Examiner* — Carib A Oquendo
(74) *Attorney, Agent, or Firm* — Baker Hughes Patent Organization

(57) ABSTRACT

A hydrocarbon production field layout comprising a first pipeline (1) with a first inner diameter and a second pipeline (2) with the first inner diameter. A cut off valve (20) with an inner bore with the first diameter, is arranged in a connecting arrangement between an end of the first pipeline (1) and an end of the second pipeline (2). At least one dual main header manifold (3) is in fluid connection with at least one hydrocarbon well (8, 9). A first branch pipe (16, 18) with a first valve (5, 6) is branched off from the first pipeline (1) and a second branch pipe (17, 19) with a second valve (5, 7) is branched off from the second pipeline (2). The branch pipes are connected to the at least one manifold (3, 4).

8 Claims, 4 Drawing Sheets

Figure 1:
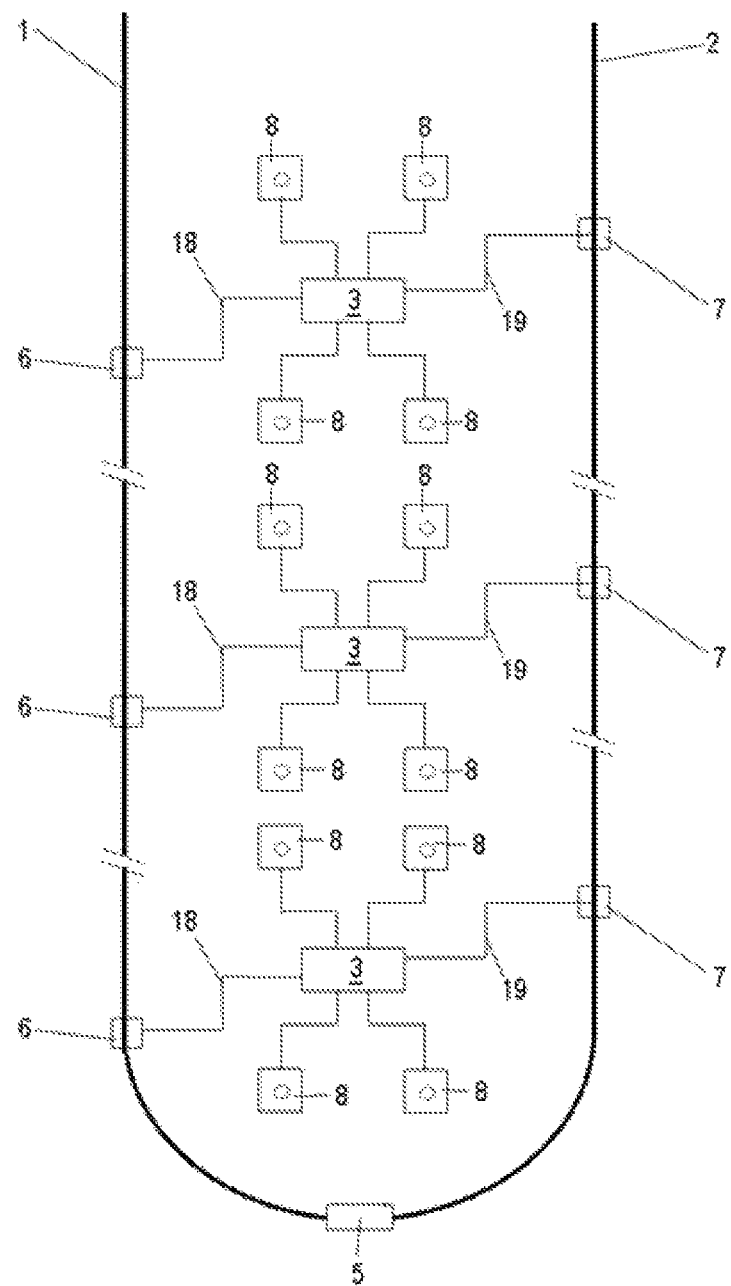

(51) Int. Cl.
*F16L 101/12* (2006.01)
*F16L 101/30* (2006.01)

(56) References Cited

FOREIGN PATENT DOCUMENTS

| WO | 02/088519 A1 | 11/2002 |
| WO | 03067147 W | 8/2003 |
| WO | 2008/070648 A2 | 6/2008 |
| WO | 2017174968 A1 | 10/2017 |

* cited by examiner

HYDROCARBON PRODUCTION FIELD LAYOUT

The present application relates to a field configuration or layout of a pipeline in fluid connection with manifolds utilised in connection with wells, in particular for producing hydrocarbons. The present invention is utilized for round trip pigging, and includes the use of dual header manifolds.

The term manifold in connection with the following specification is intended to cover manifolds as typically used in connection with the field of production of oil and gas and is not intended to cover any branched pipe or header. Those elements also have a specific meaning within this field.

When producing hydrocarbons and conveying the hydrocarbon fluids through a pipeline, it is sometimes required to perform various tasks inside the pipeline. One way of performing such tasks involves using a "pig" that is a plug that is pumped through the pipeline to perform the task. Tasks that are performed includes cleaning and inspecting the pipeline. The operation running a plug involves inserting the pig into a launching station and applying a pressure difference over the plug to run the plug. The pipeline must run in a loop to allow the plug to be ran through the pipeline and to return the plug.

Wax and deposits from the hydrocarbon fluids have a tendency to stick to the inner walls of the pipeline in cold areas of the pipeline at some distance from the wells, as the pipeline has cooled the fluid sufficiently for the wax to build up. Wax deposits are therefore typically not a problem in the wellheads and in the manifolds and the other equipment close to the wells as the fluids are sufficiently hot to prevent wax deposits.

The pipeline cannot be round trip pigged if it includes equipment/sections with a reduced diameter, if the pipeline is not in a loop, or if the pipeline cannot be turned into a loop.

Traditional systems with pipelines extending from manifolds on a seabed typically includes two pipelines. Using two or more pipelines provide flow paths with low flow resistance, provide a failsafe system if one pipeline or equipment in relation to this pipeline should fail, and allow service while maintaining production.

Having two pipelines also enables the pipelines to be arranged in a loop to allow a pig to perform a complete run through both pipelines.

Providing such a loop typically involves installing a pipeline loop connecting two separate bores of a manifold conveying well fluids to the pipelines. The pipeline loop may be installed specifically at the time of the pigging operation. Alternatively, the loop is permanently installed between the manifold bores and includes a full bore cut off valve. The pig must run through the manifold or manifolds in both situations, and the inner diameter of the main bores of the manifolds must be dimensioned to the pipelines to allow pigging.

Pigging of manifolds is superfluous as manifolds operate at temperatures where waxing not is an issue.

In the above pipeline and manifold configurations, the well fluids typically also flow through several manifolds such that the manifolds additionally must be dimensioned to the maximum flow of well fluids from several wells.

Accordingly, it is a purpose of the present invention to provide a well configuration where the manifolds not need to be dimensioned to the pipeline (not being full bore), but only need to be dimensioned to the flow from the wells the manifolds are connected to.

Furthermore, for subsea productions fields, there is a continuous demand for simplification. All equipment used on a subsea field needs to be shipped out and lowered to a seabed, where after further operations are necessary to connect the equipment and infrastructure to arrive at a functional field. The completion of a subsea production field is time consuming and cost driving and the level of complexity may for remote fields be decisive for the viability of the field.

It is therefore also a purpose of the present invention to present a simplified structure for a subsea production field. It is also a purpose to avoid header valves on the manifolds and to reduce the number of jumpers and connections. Furthermore, is an advantage that a main flowline can be completely installed in one run and commission pigging can be performed without any manifolds installed.

Accordingly, the present invention relates to a hydrocarbon conveying pipeline layout. The layout comprises a first pipeline with a first inner diameter and a second pipeline with the first inner diameter. A connecting arrangement with a cut off valve includes an inner bore with the first diameter, connecting an end of the first pipeline and an end of the second pipeline. At least one manifold is in fluid connection with at least one hydrocarbon well. A first branch pipe with a first valve is branched off from the first pipeline and is connected to the at least one manifold. A second branch pipe with a second valve is branched off from the second pipeline connecting the second pipeline to the at least one manifold.

The connecting arrangement with a cut off valve, connecting the end of the first pipeline and the second pipeline may include just one bore, and one valve. The pipelines may be permanently welded to the connecting arrangement. The at least one manifold must then be connected to In-Line Tees on the pipelines. The connecting arrangement is considered to be without ports when the pipelines are permanently welded to the connecting arrangement.

The first pipeline and the second pipeline provide a redundant system as the flow of fluids selectively can flow through either pipeline. The ends of the first and second pipeline represent a termination of each pipeline.

The connecting arrangement with a cut off valve connecting the first pipeline and the second pipeline may be a dual in-line tee (ILT), and the first valve controlling a flow in the first branch pipe may then be located in the dual ILT. The second valve controlling a flow in the second branch pipe may also be located in the dual ILT.

The in-line tees and the dual in-line tees may include integrated equipment packages that create a branched line tie-in point along the pipeline. By adding in-line tees along the pipeline, an operator can plan for future tie-in points for further manifolds.

The ILTs and the dual ILT may include a skid with necessary valves, lifting and support structures, mud mats and piping components. This facilitates simple installation into the line during launching and pipe-lay operations. The ILTs and the dual ILT may include standard ROV-interface panels.

The dual ILT includes two branched line tie-in points and a full bore cut-off valve at the junction between the first pipeline and the second pipeline as defined in this specification.

The dual ILT may include at least two ports (in addition to the connections with the first and second pipeline) and three valves.

The first valve controlling a flow in the first branch pipe may be located in a first ILT, and the second valve controlling a flow in the second branch pipe may be located in a second ILT.

The hydrocarbon conveying pipeline layout may include a first and a second manifold. The first branch pipe of the first manifold may then be branched off from a dual ILT, connecting the first manifold to the first pipeline, and the second branch pipe of the first manifold may be is branched off from the dual ILT, connecting the first manifold to the second pipeline. The first branch pipe of the second manifold is then branched off from a first ILT, connecting the second manifold to the first pipeline. The second branch pipe of the second manifold may be branched off from a second ILT, connecting the second manifold to the second pipeline.

The hydrocarbon conveying pipeline layout may include a plurality of manifolds. Each additional manifold beyond two may be branched off from the two pipelines with two additional ILTs for each additional manifold.

The diameters in the pipelines may be larger than the diameters in the bores of the manifolds and in the branch pipes, i.e. the first diameter may be larger than the second diameter.

SHORT DESCRIPTION OF THE DRAWINGS

Figure 2:
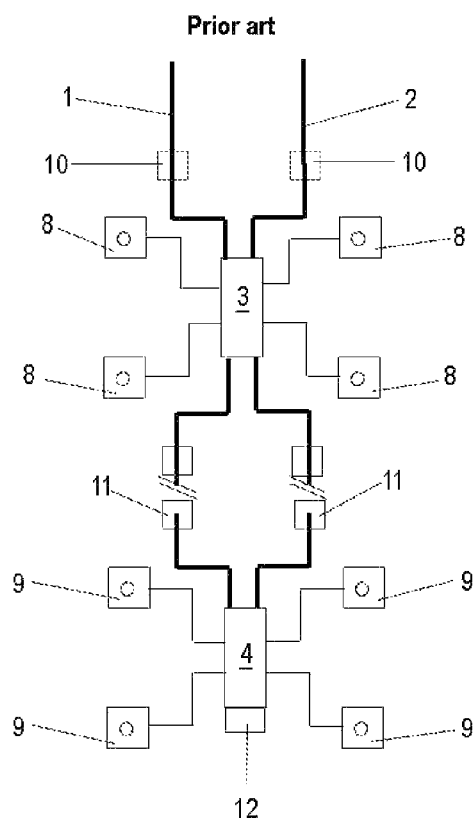
Figure 3:
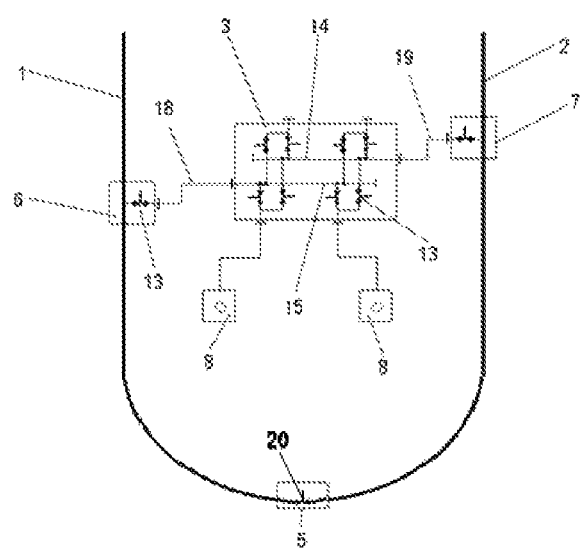
Figure 4:
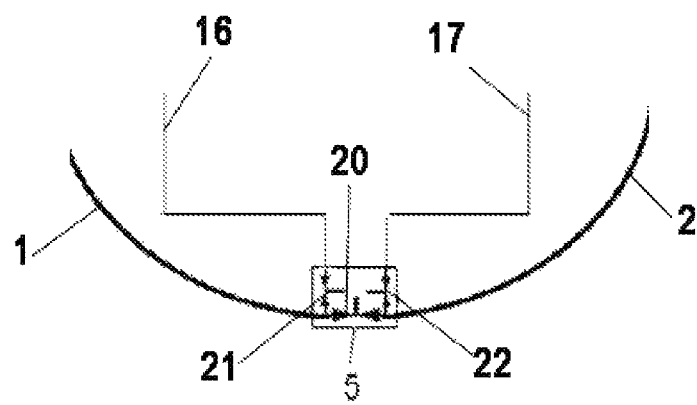

FIG. 1 is a schematic representation of a pipeline configuration of the present invention;
FIG. 2 is a schematic representation of a pipeline configuration of the prior art;
FIG. 3 is a schematic representation of a portion of the pipeline configuration of the invention as shown in FIG. 1; and
FIG. 4 is a detail of the Dual In-Line Tee of FIG. 1.

DETAILED DESCRIPTION OF AN EMBODIMENT OF THE INVENTION WITH REFERENCE TO THE DRAWINGS

FIG. 1 is a schematic representation of a pipeline configuration of the present invention. A first pipeline 1 from a remote location is interrupted by a first In-line Tee (ILT) 6 and terminates in a connecting arrangement with a cut off valve shown as a dual In-line Tee (ILT) 5. A second pipeline 2 from the remote location is interrupted by a second In-line Tee (ILT) 7 and terminates in the dual In-line Tee (ILT) 5. The dual ILT include two ports for connection to the branch pipes. The first and second pipeline are permanently welded to the Dual ILT.

Four jumpers connect a first dual main header manifold 3 with four wells 8 through wellheads. A flow path is provided by a branch pipe 18 between the first ILT 6 and the first manifold 3, and by a branch pipe 19 between the second ILT 7 and the manifold 3.

A further dual main header manifold 3 is shown to illustrate that the number of dual main header manifolds not is limited to one or two.

Four further jumpers connect a second manifold 4 with four further wells 9 through wellheads. Two individual flow paths are provided by two branch pipes 16, 17 between the dual ILT 5 and the second manifold 4.

The dual ILT 5 is a full bore ILT allowing a pig to pass from the first pipeline 1 to the second pipeline 2 when a cut-off valve in the dual ILT is open. The first ILT 6 and the second ILT 7 are also full bore ILTs allowing a pig to pass.

Accordingly, a pig can be circulated through the pipeline 1, past the first ILT 6 further through the first pipeline 1, through the dual ILT 5 into the second pipeline 2, through the second ILT 7 and further through the second pipeline 2. The first and the second ILTs 6, 7 also include cut-off valves to cut the flow of fluids between the pipelines 1, 2 and the branch pipes 18, 19 while maintaining the flow through the pipelines.

The pig will not be circulated through any of the manifolds, and each manifold will only handle fluids from the wells that specific manifold is connected to.

During normal operation (not pigging), the valve connecting the first pipeline 1 and the second pipeline 2 in the dual ILT is closed, isolating first pipeline 1 from the second pipeline 2.

FIG. 1 shows two manifolds 3, 4, each connected to four wells. Clearly, the number of wells connected to each manifold can depart from four. Similarly can also the pipeline configuration be used with only one or more than two manifolds.

The manifolds 3 are dual main header manifolds as each manifold is connected to two pipelines, and each main header convey well fluids. The manifolds may also include auxiliary headers for other purposes but these headers are not considered as main headers.

The dual main header manifolds not connected to other manifolds, and no fluid flow occurs from one manifold to another.

FIG. 2 is a schematic representation of a pipeline configuration of the prior art. In this configuration, the first pipeline 1 and the second pipeline 2 are connected to their respective first pipeline end terminations 10 (PLET) and then to two bores in a first manifold 3. Four jumpers connect the first manifold 3 with four wells 8 through wellheads.

Four further jumpers connect a second manifold 4 with four further wells 9 through wellheads. Two individual flow paths are provided between the first manifold 3 and the second manifold 4 through second pipeline end terminations (PLET) 11.

A loop 12 across the two bores of the second manifold 4 allows a pig to pass between a first and a second bore in the second manifold 4. The second manifold 4 or the bypass pipeline 12 includes one or several valves to isolate the first and second bore in the second manifold 4 during normal operation.

The flow of fluids from the second manifold 4 flows through the first manifold 3 before the fluids are brought further. Accordingly, the first manifold 3 handles fluids from both of the manifolds 3,4. The pigable configuration in FIG. 2 require headers and header valves with the same inner diameter as the flowlines.

FIG. 3 is a schematic representation of a portion of the pipeline configuration of the invention, including a manifold 3, ILTs 6, 7 and wells 8. Cut off valves 13 and two main bores forming the dual main headers 14, 15 in the manifold 3 enables the manifold 3 to selectively connect any of the two bores or dual main headers 14, 15 with any of the wells 8. The cut off valves 13 in the ILTs 6, 7 allow the manifold 3 to be isolated from any of the two pipelines 1, 2. A first branch pipe 18 conveys well fluid form the manifold 3 and to the first ILT 6, and a second branch pipe 19 conveys well fluid form the manifold 3 and to the second ILT 7. A cut off valve 20 connecting the first and second pipeline is opened if round pigging is required.

FIG. 4 is a schematic representation of the Dual In-line Tee (Dual ILT) 5 shown in FIG. 1. The Dual ILT connects the ends of the first pipeline 1 and the second pipeline 2. The Dual ILT 5 is a full bore ILT with a cut off valve 20 selectively opening or closing the bore connecting the pipelines 1 and 2. A first branch valve 21 selectively connects the first branch pipe 16 to the first pipeline 1, and a second branch valve 22 selectively connects the second branch pipe 17 to the second pipeline 2. The bores and the valves 21, 22 for the first and second branch pipes 16, 17 in the Dual ILT may be of a smaller diameter than the diameter of the pipelines 1, 2.

In the above description, the well fluid has been considered to flow from the wells and into the pipelines. In some cases, however manifolds and pipelines are used for injecting fluids into the wells, and the present invention does not exclude such injection of fluids.

The invention claimed is:

1. A hydrocarbon production field layout allowing round trip pigging, comprising;
   a first pipeline defining a bore having a first inner diameter;
   a second pipeline defining a bore having an inner diameter equal to the first inner diameter;
   a cut off valve (20) with an inner bore having a third diameter equal to the first diameter, the cut off valve arranged in a connecting arrangement between an end of the first pipeline and an end of the second pipeline;
   at least one dual main bore manifold in fluid connection with at least one hydrocarbon well, the at least one dual main bore manifold defining two main bores having an inner diameter;
   a first branch pipe with a first valve branched off from the first pipeline to the at least one dual main bore manifold, the first branch pipe defining a bore having an inner diameter; and
   a second branch pipe with a second valve branched off from the second pipeline to the at least one dual main bore manifold the second branch pipe defining a bore having an inner diameter,
   wherein the respective inner diameters of the two main bores of the at least one dual main bore manifold are smaller than the first inner diameter.

2. The hydrocarbon production field layout, of claim 1, wherein the connecting arrangement comprising the cut off valve is a dual in-line tee (ILT), the first valve is located in the dual ILT and controls a flow in the first branch pipe, and the second valve is located in the dual ILT and controls a flow in the second branch pipe.

3. The hydrocarbon production field layout, of claim 1, wherein
   the first valve controlling a flow in the first branch pipe is located in a first ILT; and
   wherein the second valve controlling a flow in the second branch pipe is located in a second ILT.

4. The hydrocarbon production field layout of claim 1, including a first and a second dual main bore manifold;
   wherein the first branch pipe of the first dual main bore manifold is branched off from a dual ILT, connecting the first dual main bore manifold to the first pipeline;
   wherein the second branch pipe of the first dual main bore manifold is branched off from the dual ILT, connecting the first dual main bore manifold to the second pipeline;
   wherein the first branch pipe of the second dual main bore manifold is branched off from a first ILT, connecting the second manifold to the first pipeline; and
   wherein the second branch pipe of the second dual main bore manifold is branched off from a second ILT, connecting the second manifold to the second pipeline.

5. The hydrocarbon production field layout of claim 1, including a plurality of dual main bore manifolds, wherein each additional dual main bore manifold beyond two is branched off from the two pipelines with two additional ILTs.

6. The hydrocarbon production field layout of claim 1, wherein the respective inner diameters of the first branch pipe and the second branch pipe are smaller than the first diameter.

7. The hydrocarbon production field layout of claim 6, wherein the first valve and the second valve each define a respective inner bore having a respective inner diameter that is smaller than the first inner diameter.

8. The hydrocarbon production field layout of claim 1, wherein each well includes a Xmas tree and a wellhead.

* * * * *